United States Patent [19]

Howell et al.

[11] Patent Number: 5,276,901
[45] Date of Patent: Jan. 4, 1994

[54] SYSTEM FOR CONTROLLING GROUP ACCESS TO OBJECTS USING GROUP ACCESS CONTROL FOLDER AND GROUP IDENTIFICATION AS INDIVIDUAL USER

[75] Inventors: William E. Howell, North Richland Hills; Hari N. Reddy, Grapevine; Diana S. Wang, Trophy Club, all of Tex.

[73] Assignee: International Business Machines Corporation, Armonk, N.Y.

[21] Appl. No.: 807,685

[22] Filed: Dec. 16, 1991

[51] Int. Cl.$^5$ ............................................. G06F 12/14
[52] U.S. Cl. .................................... 395/800; 395/600; 364/246.9; 364/261.2; 364/286.4; 364/969.4; 364/DIG. 1; 340/825.31; 380/4
[58] Field of Search .................... 340/825.31, 825.34, 340/825.5; 380/4, 25; 395/600, 800

[56] References Cited

U.S. PATENT DOCUMENTS 4,104,721 8/1978 Marstein et al. .................... 364/200
5,014,345 5/1991 Comroe et al. ....................... 455/54

FOREIGN PATENT DOCUMENTS 0398645 11/1990 European Pat. Off. ..... G06F 15/40

OTHER PUBLICATIONS

C. J. Date, *An Introduction to Database Systems*, vol. II, 1983, pp. 158-159.
Shien et al., "An N-Grid Model for Group Authorization", *Proceedings of the Sixth Annual Computer Security Applications Conference*, Dec. 3-7, 1990, pp. 384-392.
Wilms et al., "A Database Authorization Mechanism Supporting Individual and Group Authorization", *Second International Seminar on Distributed Data Sharing Systems*, 1982, pp. 273-292.

*Primary Examiner*—Thomas C. Lee
*Attorney, Agent, or Firm*—Andrew J. Dillon

[57] ABSTRACT

A method and system for controlling access by groups of users to multiple objects stored within a data processing system implemented library wherein each object has an access list associated therewith explicitly listing individual users permitted access to that object. A group identification is established which encompasses all users within the data processing system, a selected subset of users with the data processing system, or a single selected user and his or her designated affinity users or proxies. The group identification is then listed within an associated access list for a particular object and upon an attempted access of the particular object by a user not listed explicitly within the associated access list, a determination is made as to whether or not that user is listed within a group identification which is permitted access. In one embodiment of the present invention selected objects and users each have associated therewith a clearance level and access to a selected object by a particular user listed within a group identification may be denied if that particular user's clearance level does not meet or exceed the clearance level of the selected object.

6 Claims, 3 Drawing Sheets

SYSTEM FOR CONTROLLING GROUP ACCESS TO OBJECTS USING GROUP ACCESS CONTROL FOLDER AND GROUP IDENTIFICATION AS INDIVIDUAL USER

BACKGROUND OF THE INVENTION

1. Technical Field

The present invention relates in general to access control within a data processing system implemented library and in particular to access control within a data processing system implemented library wherein access to objects is limited to explicitly listed users for each object within the library. Still more particularly, the present invention is directed to a method and system which permits all users within a data processing system, designated groups of users, or a single selected user and his or her designated affinity users or proxies to access an object within a data processing system implemented library without requiring an explicit listing of each user who is permitted access.

2. Description of the Related Art

Electronically implemented "libraries" are rapidly surpassing more traditional information storage in the world today. It is quite common for data processing system implemented libraries to maintain control thousands of different objects, or documents. The rules by which such documents may be altered and/or maintained are typically governed by various standards, such as the International Standard ISO/IEC 10166, Document Filing and Retrieval (DFR).

One problem which exists in such electronic libraries is the management and control of the documents stored therein. Generally, two specific security mechanisms are provided by such electronic libraries. Firstly, authentication of the identity of a particular user is generally addressed in an electronic library. This is generally accomplished utilizing a password known only to the system operator and the user, or, in cases where a user has been previously authenticated elsewhere, by checking a certified identity. An authentication mechanism is usually utilized to verify the credentials of a user requesting access to documents within an electronic library. Access to an electronic library does not, in and of itself, qualify the user to access all objects stored within the library.

The access by a user to a particular object or document within an electronic library is generally controlled by access authorization. Documents or objects within an electronic library generally have designated an Owner who is a user within the system having specific privileges with regard to the owned object or document. Generally each Owner within electronic library may add further owners, or delete existing ones. The Owner of a document may typically specify the authority of other non-owner individuals with respect to a particular object or document within the electronic library. For example, the Owner may grant a particular user read, copy, extended-read, read-modify, or read-modify-delete access to a particular object or document within an electronic library.

Certain electronic libraries are known as explicit access libraries in that in order for a user to access a particular object or document within the electronic library, the identification of that user must be explicitly listed in a control access list associated with the particular object or document. This is particularly true for International Standard ISO/IEC 10166, Document Filing and Retrieval (DFR) systems, as noted above. While such systems permit accurate control of objects or documents stored within the electronic library those skilled in the art will appreciate that an explicit access listing type electronic library rapidly becomes inefficient in that each user within the data processing system permitted to access an object within a library of this type must be explicitly listed within the access control listing for each object.

Therefore, it should be apparent that a need exists for a method and system whereby large groups of designated users or so-called "affinity" users of authorized accessors may be permitted to access an object within a data processing system which is implemented utilizing such an explicit listing access authorization system.

SUMMARY OF THE INVENTION

It is therefore one object of the present invention to provide an improved system of access control within a data processing system implemented library.

It is another object of the present invention to provide an improved system of access control within a data processing system implemented library wherein access to objects within that library is limited to explicitly listed users for each object within the library.

It is yet another object of the present invention to provide an improved method and system which permits designated groups of users or a single selected user and his or her designated affinity users or proxies to access an object within a data processing system implemented library without requiring an explicit listing of each user who is permitted access.

The foregoing objects are achieved as is now described. A data processing system implemented library is provided wherein each object has an access list associated therewith explicitly listing individual users permitted access to that object. A group identification is established which may encompass all users within the data processing system, a selected subset of users with the data processing system, or a single selected user and his or her designated affinity users or proxies. The group identification is then listed within an associated access list for a particular object and upon an attempted access of the particular object by a user not listed explicitly within the associated access list, a determination is made as to whether or not that user is listed within a group identification which is permitted access. In one embodiment of the present invention selected objects and users each have associated therewith a clearance level and access to a selected object by a particular user listed within a group identification may be denied if that particular user's clearance level does not meet or exceed the clearance level of the selected object.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
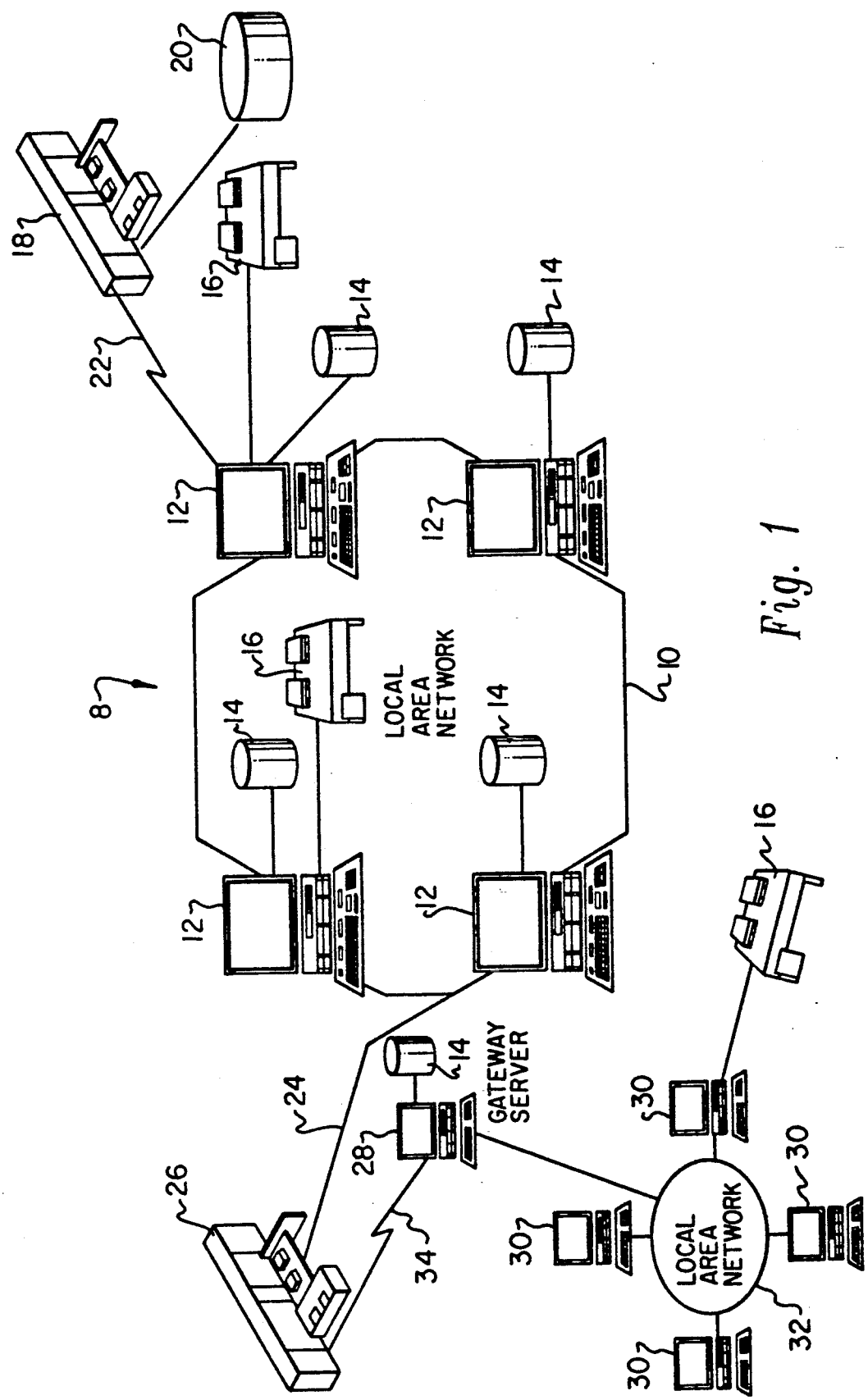
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such a Local Area Networks (LAN) 10 and 32, each of which preferably includes a plurality of individual computers 12 and 30, respectively. Of course, those skilled in the art will appreciate that a plurality of Intelligent Work Station (IWS) coupled to a host processor may be utilized to implement each such network.

As is common in such data processing systems, each individual computer may be coupled to a storage device 14 and/or a printer/output device 16. One or more such storage devices 14 may be utilized, in accordance with the method and system of the present invention, to store the various objects or documents which may be periodically accessed by a user having access to such objects or documents in a data processing system implemented library. Further, one or more such storage devices 14 may be utilized, as will be explained in greater detail herein, to store the various access lists which are utilized to implement the method and system of the present invention.

Still referring to FIG. 1, it may be seen that distributed data processing system 8 may also include mainframe computers, such as mainframe computer 18, which may be preferably coupled to Local Area Network (LAN) 10 by means of communications link 22. Mainframe computer 18 may be coupled to a storage device 20 which may serve as remote storage for Local Area Network (LAN) 10 and may be coupled via communications controller 26 and communications link 34 to gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects or documents may be stored within storage device 20 and controlled by mainframe computer 18, as Resource Manager or Library Service for the data objects and documents thus stored. In the depicted embodiment of the present invention such objects and/or documents are preferably stored and maintained in accordance with International Standard ISO/IEC 10166 Document Filing and Retrieval (DFR). Those skilled in the art will appreciate that it is often desirable to maintain a data processing system implemented library at a central location within a distributed data processing system wherein users throughout the distributed data processing system may access objects or documents stored therein.

Figures 2, 3:
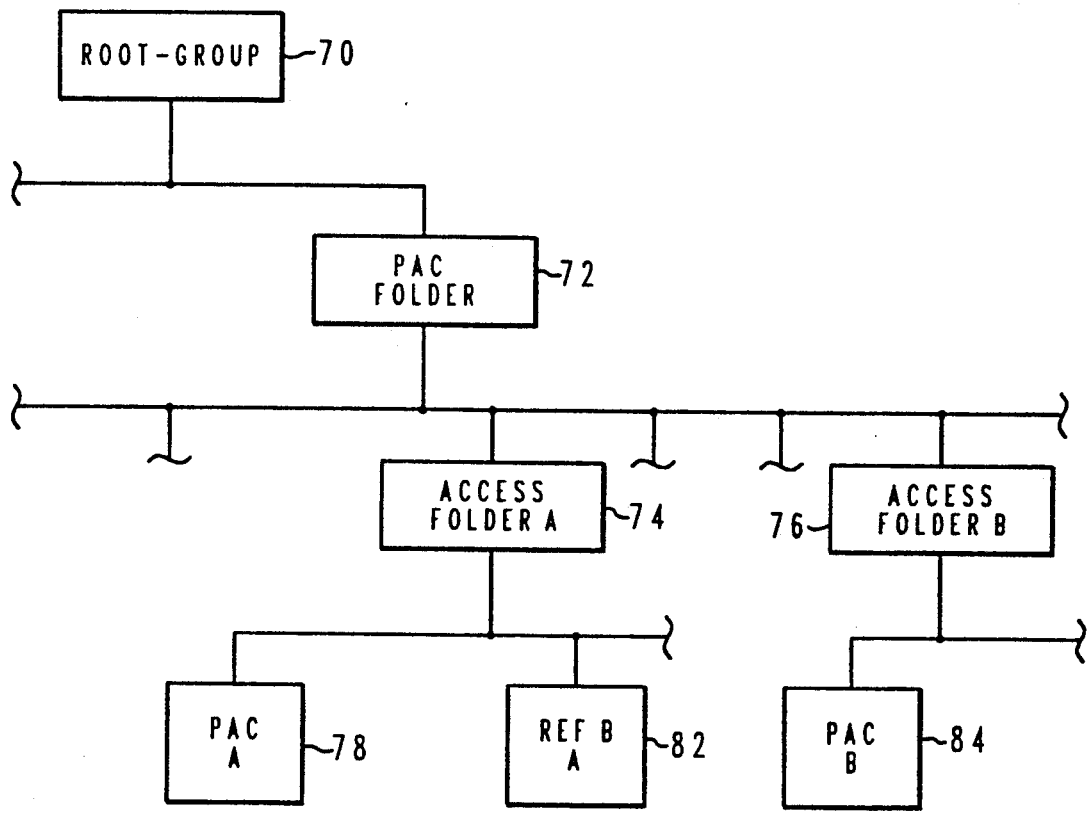
FIG. 2 is a schematic pictorial representation of an object within a data processing system implemented library which may be accessed by a user utilizing the method and system of the present invention.
FIG. 3 is a pictorial representation of an access control listing which may be utilized to implement the method and system of the present invention.

Referring now to FIG. 2, there is depicted a schematic pictorial representation of a Library Object 50 within a data processing system implemented library which may be accessed by a user utilizing a method and system of the present invention. As illustrated, library object 50 includes a library object area 52 and various control attributes which are typically contained within a Control-Attribute Package (CAP) within a DFR complaint library.

In accordance with an important feature of the present invention, an optional attribute is added to library object 50, as indicated at reference numeral 54. The Object Access Control Type set forth at field 54 within library object 50 is considered part of the Control-Attributes-Package referenced within a library which complies with the DFR standard and, in accordance with the depicted embodiment of the present invention, may have one of three values. Firstly, the Object Access Control Type may have a value of "Public," indicating that the access control logic associated with a data processing system implemented library will not check any access list, if this attribute is present, and readily permits any user within the system to access library object 50. Next, in accordance with the method and system of the present invention, the Object Access Control Type may be "Controlled Access" wherein the access control logic will check each user's ID against an access control listing maintained by the library service, in accordance with the method and system of the present invention, to determine whether or not that user is affiliated with a group or another user in a manner which permits access of that user to library object 50.

Finally, the Object Access Control Type may have a value of "Explicit Access" wherein access to library object 50 will only be granted by the access control logic if the proposed user's access ID is listed explicitly within the explicit access list maintained within the Control-Attribute-Package.

Next, a second optional attribute within the Control-Attribute-Package is set forth within field 56. Field 56 is utilized, in accordance with the method and system of the present invention, to list an object access clearance level which may be added to control-attribute-package to specify a particular clearance level which must be met or exceeded by a user attempting access to library object 50, prior to granting the user access to library object 50. The values for this attribute are preferably scalable and selected by a customer when the library application is installed. For example, Department of Defense clearance levels such as "Confidential," "Secret," or "Top-Secret" may be utilized. Similarly, in an industrial environment, library objects may be classified as "Confidential," "Proprietary," or "Strictly Private."

Next, in accordance with the access authorization system generally specified for libraries which meet the DFR standard, explicit access list 58 is maintained within the Control-Attribute-Package. In the depicted embodiment of the present invention, two columns are listed beneath the explicit access list. Column 60 lists the name of each user having explicit access to library object 50 and Column 62 lists the access ID for each user listed within Column 60. As noted within FIG. 2, and in accordance with an important feature of the present invention, various named groups may be listed as users permitted explicit access to library object 50, in a manner which will be explained in greater detail herein.

With reference now to FIG. 3, there is depicted an access control listing which may be maintained by a library service in a data processing system implemented library and which may be utilized to implement the method and system of the present invention. Preferably, the access control listing partially set forth within FIG. 3 may be maintained within a folder document by the library service and will, in the depicted embodiment of the present invention, preferably list each user having access to the data processing system implemented library. Firstly, at reference numeral 70, a Root-Group is set forth. Creation or manipulation of a Root-Group requires special authority as set forth within International Standard ISO/IEC 10166-1 6.3.4. Listed below Root-Group 70 is a Group-Privilege-Attribute-Certificate (PAC) folder 72 which sets forth the privileges established by the owner of a document for selected groups within the data processing system which may have access to objects or documents within the DFR compliant library. PAC folder 72 is a unique folder known to the access control logic utilized by the DFR library service as a restricted folder, such that only the DFR library administrative entity may alter the contents thereof. Additionally, no entity other than the access control logic will be given access to PAC folder 72.

PAC folder 72 will preferably contain multiple Security Subject (SS) access folders, such as access folders 74 and 76. Within each such access folder are listed the Privilege-Attribute-Certificate for that Security Subject. Those skilled in the art will appreciate that a Security Subject may be an individual end user, a group of end users, an application or any other entity capable of attempting to access an object within a DFR library. Access to access folders 74 and 76 is restricted in the same manner as that described above with respect to PAC folder 72. As set forth within FIG. 3, each access folder illustrated therein will contain a Privilege-Attribute-Certificate, such as PAC A, at reference numeral 78 and PAC B at reference numeral 84. Additionally, each folder may include a PAC reference, such as the reference illustrated at reference numeral 82. Such references may link the user set forth for a particular access folder with a second access folder, indicating that user is a member of a group or has an affinity user relationship with a second user. In the preferred embodiment of the present invention, each Security Subject will have Read access authority for their own individual Privilege-Attribute-Certificate, and all Privilege-Attribute-Certificates for Security Subjects that have granted affinity relationships to that user.

As set forth within FIG. 3, access folder 76 may comprise an access folder for a department within a corporate organization which has given each member of the department an affinity user status. As one of the members of the department, the end user set forth within access folder 74 has been given affinity, as illustrated within FIG. 3, through reference 82 contained within access folder 74.

Figure 4:
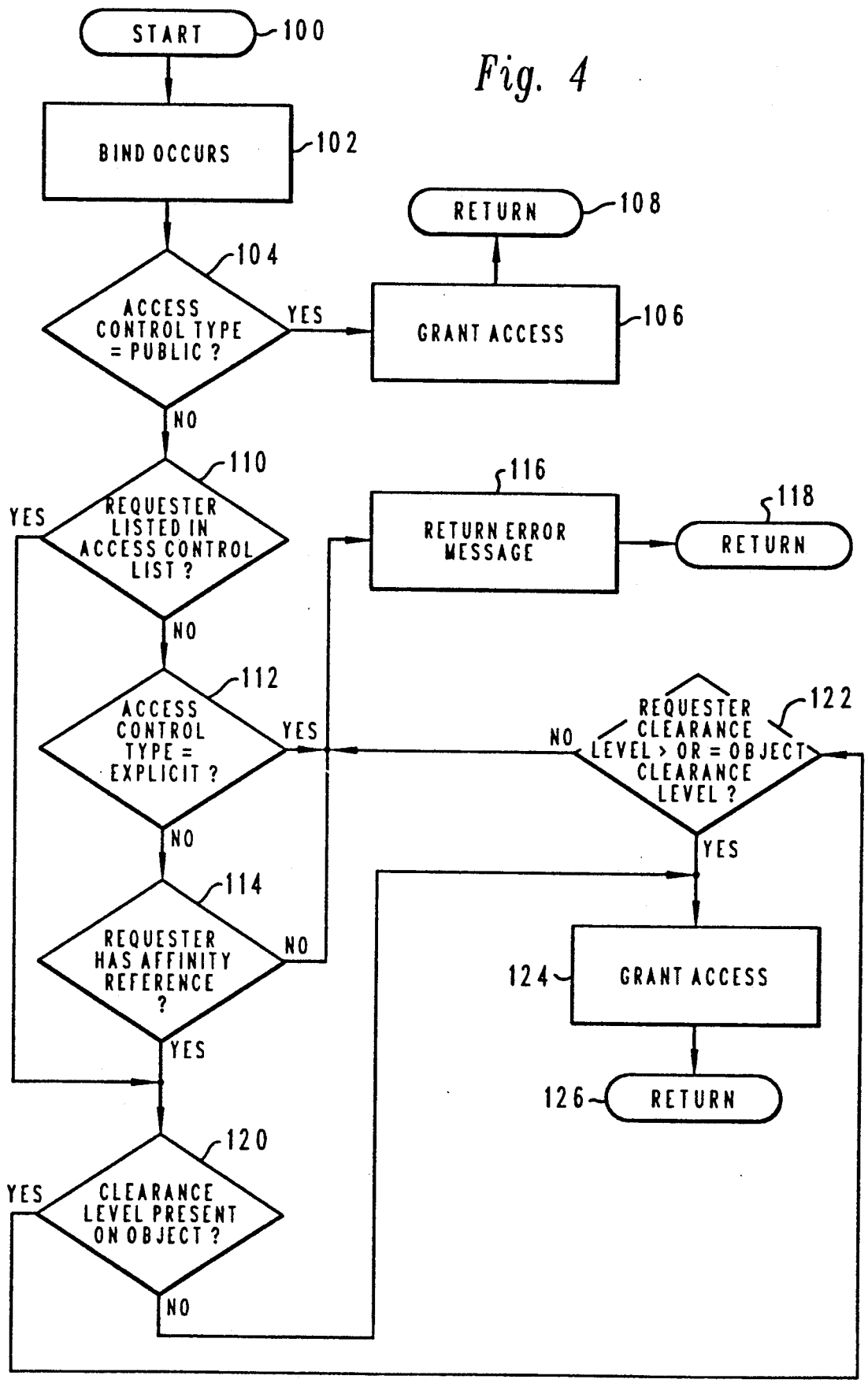
FIG. 4 is a high level logic flowchart illustrating the accessing of an object within a data processing system implemented library utilizing the method and system of the present invention.

Referring now to FIG. 4, there is depicted a high level logic flowchart illustrating the accessing of an object within a data processing system implemented library utilizing the method and system of the present invention. As illustrated, the process begins at block 100 and thereafter passes to block 102 which depicts the occurrence of a bind, indicating a user has requested access to a particular object or document within the DFR compliant library. The process then passes to block 104.

Block 104 illustrates a determination of whether or not the access control type set forth within field 54 of library object 50 (see FIG. 2) is a "Public" type. If so, the process passes to block 106, which illustrates the granting of access to the object or document and the process then passes to block 108 and returns. Referring again to block 104, in the event the access control type for a particular library object is not "Public," the process passes to block 110. Block 110 illustrates a determination of whether or not the user requesting access to a particular object or document within the DFR compliant library is listed within the explicit access list for that document. If so, the process passes to block 120 for a determination of whether or not the object in question has a clearance level set forth within field 56 (see FIG. 2) and if not, the process passes to block 124, which illustrates the granting of access and thereafter, the process returns, as depicted at block 126.

Referring again to block 120, in the event the clearance level present on the object or document within the DFR compliant library is present within field 56 (see FIG. 2) the process passes to block 122. Block 122 illustrates a determination of whether or not the user requesting access to the particular object or document has a clearance level which is greater than or equal to the object clearance level. If so, the process again passes to block 124, which illustrates the granting of access to that object or document and thereafter, as depicted at block 126, the process returns. Referring again to block 122, in the event the user does not possess the required clearance level for access to the object, the process passes to block 116 which illustrates the returning of an error message and the process then passes to block 118 and returns.

Referring again to block 110, in the event the user requesting access to a particular object or document within a DFR compliant library is not listed within the explicit access list maintained with the object, the process passes to block 112. Block 112 illustrates a determination of whether or not the object access control type for this particular object is set to "Explicit" if so, the process again passes to block 116, which depicts the returning of an error message and the process then returns, as illustrated at block 118.

Referring again to block 112, in the event the access control type for the particular object in question is not "Explicit," indicating that the object access control type is "Controlled Access" the process passes to block 114. Block 114 illustrates a determination of whether or not the user requesting access to the object or document in question has an affinity reference within that user's access folder, indicating that the user has an affiliation with another user or group which may permit access to the object or document in question. If no affinity reference is present within the access folder for this user, the process again returns to block 116, depicting the returning of an error message, and the process then returns, as illustrated at block 118.

Referring again to block 114, in the event the user requesting access to the object or document in question includes an affinity reference which permits access to that object, the process passes to block 120 for a determination of whether or not the object which the user is attempting to access includes a clearance level required for access thereto. As described above, if a clearance level is present within field 56 of the library object in question, the process passes to block 122 for a determination of whether or not the user's clearance level meets or exceeds that required clearance level. If not, the process merely passes to block 124 which illustrates the granting of access to the object and the process then returns, as depicted at block 126.

Upon reference to the foregoing those skilled in the art will appreciate that access authority is typically also listed for particular actions with respect to a library object. For example, a user may be permitted access to an object to "read" that object; however, the user may be prohibited from altering or deleting that object. For purposes of explanation, a determination of whether or not the access authority for a particular action with respect to an object within the data processing system implemented library has not been depicted within FIG. 4; however, such a determination is generally considered to be part of an access authorization system such as that disclosed herein.

Additionally, users explicitly set forth as having access to a particular object may be granted access without a determination of whether or not that user possesses the necessary clearance level for that object in the depicted embodiment illustrated within FIG. 4. However, it is possible that the clearance level of a user should be determined, despite a listing of that user as an explicitly authorized user for a particular document, in order to avoid a situation in which a user is mistakenly granted explicit access without possessing the required clearance level.

While the invention has been particularly shown and described with reference to a preferred embodiment, it will be understood by those skilled in the art that various changes in form and detail may be made therein without departing from the spirit and scope of the invention.

We claim:

1. A method in a data processing system of controlling access by groups of users to a plurality of objects stored within a data processing system library service wherein each of said plurality of objects within said data processing system library service includes associated therewith an explicit list of individual users permitted access thereto and wherein each individual user has associated therewith an access control folder which includes a listing of privileges for selected ones of said plurality of objects which said individual user is permitted to access, said method comprising the steps of:
    establishing a group identification for a selected subset of users within said data processing system and associating a group access control folder with said group identification, said group access control folder including a listing of privileges for selected ones of said plurality of objects which each individual user within said selected subset of users is permitted to access;
    inserting a reference to said group access control folder within said access control folder associated with each individual user within said selected subset of users;
    listing said group identification as an individual user within said explicit list of individual users permitted access to a particular object stored within said data processing system library service; and
    permitting access to any user within said selected subset of users via said group identification and said associated group access control folder by first determining if a particular user is listed within said explicit list of individual users permitted access to said particular object and, if not, determining if said access control folder associated with said particular user includes a reference to a group access control folder associated with said group identification listed within said explicit list of individual users permitted access to said particular object.

2. The method in a data processing system of controlling access by groups of users to a plurality of objects stored within a data processing system library service according to claim 1, wherein said step of establishing a group identification for a selected subset of users within said data processing system comprises listing said selected subset of users in a group listing in association with said group identification within said library service.

3. The method in a data processing system of controlling access by groups of users to a plurality of objects stored within a data processing system library service according to claim 1, wherein said group identification comprises a single user and any affinity users designated by said single user.

4. A data processing system for controlling access by groups of users to a plurality of objects stored within a library service within said data processing system wherein each of said plurality of objects within said library service includes associated therewith an explicit list of individual users permitted access thereto and wherein each individual user has associated therewith an access control folder which includes a listing of a privileges for selected ones of said plurality of objects which said individual user is permitted to access, said data processing system comprising:
    means for establishing a group identification for a selected subset of users within said data processing system and associating a group access control folder with said group identification, said group access control folder including a listing of privileges for selected ones of said plurality of objects which each individual user within said selected subset of users is permitted to access;
    means for inserting a reference to said group access control folder within said access control folder associated with each individual user within said selected subset of users;
    means for listing said group identification as an individual user within said explicit list of individual users permitted access to a particular object stored within said data processing system library service; and
    means for permitting access to any user within said selected subset of users via said group identification and said associated group access control folder, said permitting access means comprises means for first determining if a particular user is listed within said explicit list of individual users permitted access to said particular object and, if not, means for determining if said access control folder associated with said particular user includes a reference to a group access control folder associated with said group identification listed within said explicit list of individual users permitted access to said particular object.

5. The data processing system for controlling access by groups of users to a plurality of objects stored within a library service within said data processing system according to claim 4, wherein said means for establishing a group identification for a selected subset of users within said data processing system comprises means for listing said selected subset of users in a group listing in association with said group identification within said library service.

6. The data processing system for controlling access by groups of users to a plurality of objects stored within a library service within said data processing system according to claim 4, wherein said group identification comprises a single user and any affinity users designated by said single user.

* * * * *